United States Patent [19]

Ogawa

[11] Patent Number: 5,256,456
[45] Date of Patent: Oct. 26, 1993

[54] LIQUID CRYSTAL ALIGNMENT FILM AND METHOD OF MANUFACTURING THE SAME

[75] Inventor: Kazufumi Ogawa, Hirakata, Japan

[73] Assignee: Matsushita Electric Industrial Co., Ltd., Osaka, Japan

[21] Appl. No.: 972,151

[22] Filed: Nov. 5, 1992

Related U.S. Application Data

[63] Continuation of Ser. No. 760,998, Sep. 17, 1991, Pat. No. 5,186,986.

[30] Foreign Application Priority Data

Sep. 17, 1990 [JP] Japan ................................. 2-248183

[51] Int. Cl.$^5$ ........................................... G02F 1/1337
[52] U.S. Cl. ......................................... 428/1; 359/75; 359/76; 359/78; 428/447
[58] Field of Search .................. 428/1, 447; 359/76, 359/78, 75

[56] References Cited

U.S. PATENT DOCUMENTS

3,989,354 11/1976 Dubois et al. ........................ 428/1

FOREIGN PATENT DOCUMENTS

0261712 3/1988 European Pat. Off. .
0312100 4/1989 European Pat. Off. .
0386782 9/1990 European Pat. Off. .
  16419 1/1982 Japan .
1525335 9/1976 United Kingdom .

OTHER PUBLICATIONS

C. S. Mullen et al., "Properties of liquid-crystal monolayers on silane surfaces", *The American Physical Society*, Physical Review A, vol. 39, No. 7, Apr. 1989, pp. 3745-3747.

European Patent Office search report for EP Application No. 91115590, dated 28 Sep. 1992.

*Primary Examiner*—Alexander S. Thomas
*Attorney, Agent, or Firm*—Ratner & Prestia

[57] ABSTRACT

The invention concerns a liquid crystal alignment film, which comprises of a monomolecular film having straight carbon chains. The straight carbon chains are directly or indirectly chemically adsorbed at one end via a —Si—O— bond to an electrode, and are cross-linked in a state of orientation in a particular direction.

19 Claims, 9 Drawing Sheets

LIQUID CRYSTAL ALIGNMENT FILM AND METHOD OF MANUFACTURING THE SAME

This application is a continuation of application Ser. No. 07/760,998, filed Sep. 17, 1991 U.S. Pat. No. 5,186,986.

BACKGROUND OF THE INVENTION

1. Field of the Invention

This invention relates to a liquid crystal alignment film using a specific monomolecular film, a method of manufacturing the same, a liquid crystal display apparatus and a method of manufacturing the same.

More specifically, the invention concerns a liquid crystal alignment film used for plane liquid crystal display panels for displaying TV images and computer images, a method of manufacturing the same liquid crystal alignment film, a liquid crystal display apparatus using the same film and a method of manufacturing the same film.

2. Description of the Prior Art

With a liquid crystal display apparatus, it is necessary to provide an alignment film between the electrode surface and the liquid crystal composition in order to obtain normal operation with application of an electric field to the liquid crystal composition. The alignment film is necessary for conventional liquid crystal elements such as monochromatic and color liquid crystal elements.

A conventional color liquid crystal display panel will now be described.

The prior art color liquid crystal display panel has a structure, in which a liquid crystal is sealed between two substrates provided with opposed matrix array electrodes via liquid crystal alignment films formed by coating polyvinyl alcohol or polyimide with a spinner (i.e., by centrifugal spin coating).

FIG. 8 shows such a prior art color liquid crystal display panel. As shown, the apparatus has a first glass substrate 31 provided with a TFT (thin-film transistor) array 33 with pixel electrodes 32 and a second glass substrate 34 provided with pluralities of red, blue and green color filters 35, and transparent electrode 36. Liquid crystal alignment films 37 are then formed on top of the layers previously applied to glass substrate 31 and 34 by coating the substrates with polyvinyl alcohol or polyimide using a spinner and then polishing (or rubbing). These coated substrates are then assembled together by sealing them with adhesive 39 with a spacer 38 interposed between them. The sealed space is filled with twisted nematic (TN) liquid crystal 40 or the like, thus obtaining a panel structure. Polarizer 41 and 42 are disposed on the front and back sides of the panel, respectively. A color image is displayed on the apparatus in the direction of arrow A by operating TFT array 33 while illuminating the apparatus with backlight 43.

The alignment film is also necessary for other ferroelectric liquid crystals.

However, in the prior art the alignment film is produced by dissolving a resin such as polyvinyl alcohol or polyimide in an organic solvent, coating the solution by a rotational (or spin) coating method or the like and then polishing using a felt cloth or the like. Therefore, it is difficult to obtain uniform coating of an alignment film in the case of a large area panel (for instance a 14-inch display). In addition, with rotational coating the coating thickness is on the order of several microns. This results in great performance deterioration in the case of a display panel requiring an alignment film with a thickness of the order of 100 nm such as ferroelectric liquid crystals. For example, it is difficult to obtain a thin and uniformly thick coating of the resin component with conventional rotational coating techniques. In addition, it is difficult to carry out the polishing with a uniform pressure. Further, if the glass substrate has slight surface irregularities or if the resin component film has thickness irregularities, recessed portions fail to be polished.

SUMMARY OF THE INVENTION

The present invention seeks to solve the above problems in the prior art, and it provides a liquid crystal alignment film, a method of manufacturing the same film, a liquid crystal display apparatus and a method of manufacturing the same apparatus, which all use a particular monomolecular film permitting highly effective formation of an alignment film used for liquid crystal display panels. The film is produced uniformly and thinly without the need for polishing (or rubbing).

According to the invention, there is provided a liquid crystal alignment film, which comprises a monomolecular film including straight chains directly or indirectly chemically adsorbed at one end to an electrode via —Si—O— bonds and crosslinked in a state of alignment in a particular direction.

According to the invention, there is also provided method of making a liquid crystal alignment film which comprises the steps of: causing simultaneous chemical adsorption of: a silane-based surface active agent having intramolecular dipoles and containing polymerizable groups in a non-aqueous organic solvent; or a plurality of different silane-based surface active agents containing polymerizable groups and mixed with the first-mentioned silane-based surface active agent; on a predetermined substrate surface formed with an electrode, in order to chemically couple silicon groups of the active agent or agents thereby forming a monomolecular film on the substrate surface; and irradiating the adsorbed silane-based surface active agent or agents with an energy beam while the agent or agents are aligned in a magnetic or electric field, to cause reaction of the polymerizable groups and thus effect crosslinking thereof, thereby effecting alignment and fixing of the adsorbed silane-based surface active agent or agents.

According to the invention, there is further provided a liquid crystal display apparatus, which comprises a pair of opposed electrodes, a liquid crystal alignment film formed on at least one of the electrodes and a liquid crystal provided between the opposed electrodes, the liquid crystal alignment film comprising a monomolecular film having straight carbon chains, the straight carbon chains having one end directly or indirectly chemically adsorbed to an electrode via a —Si—O— bond (covalent bond) and being crosslinked in a state of alignment in a particular direction.

According to the invention, there is still further provided a method of manufacturing a liquid crystal display apparatus, which comprises the steps of:

(1) causing chemical adsorption of a silane-based surface active agent having straight carbon chains and polymerizable groups in a non-aqueous organic solvent either directly or indirectly as a thin film on an electrode of a first substrate provided in advance with a first electrode group in a matrix array;

(2) irradiating the adsorbed silane-based surface active agent or agents with an energy beam, while the agents are maintained in an aligned state by application of a magnetic or electric field, to cause reaction of the polymerizable groups and thus effect crosslinking thereof, thereby effecting alignment and fixing of the adsorbed silane-based surface active agent or agents;

(3) positioning a second substrate with a second electrode group opposing the first electrode group and bondingly securing the first and second substrates to each other; and (4) injecting a predetermined liquid crystal portion into the space defined between the first and the second substrates.

As mentioned above, the liquid crystal alignment film according to the invention, has a structure consisting of a monomolecular film including straight carbon chains directly or indirectly chemically adsorbed at one end to an electrode via a —Si—O— bond and crosslinked in a state of alignment in a particular direction. It is thus possible to produce a high quality alignment film used for a liquid crystal display panel without polishing (or rubbing).

Also, with the method of manufacturing a liquid crystal alignment film according to the present invention, a chemically adsorbed monomolecular film can be polymerized in an aligned state in an electric or magnetic field. The liquid crystal alignment film noted above thus can be produced highly efficiently, thinly and uniformly.

Further, with the liquid crystal display apparatus according to the invention, a high performance display panel using the liquid crystal alignment film noted above can be manufactured at low cost.

Still further, with the method of manufacturing the liquid crystal display apparatus according to the invention, the high performance display panel can be manufactured easily and efficiently.

DETAILED DESCRIPTION OF THE INVENTION

An embodiment of the invention will now be described in detail with reference to the drawings.

Figure 1A:
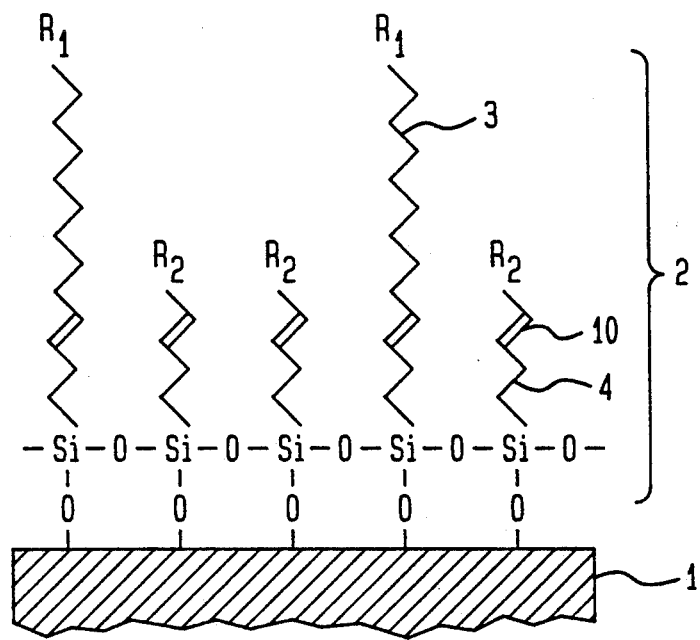
FIGS. 1(a) is a greatly enlarged cross sectional view of an uncrosslinked monomolecular layer according to the present invention.
Figure 1B:
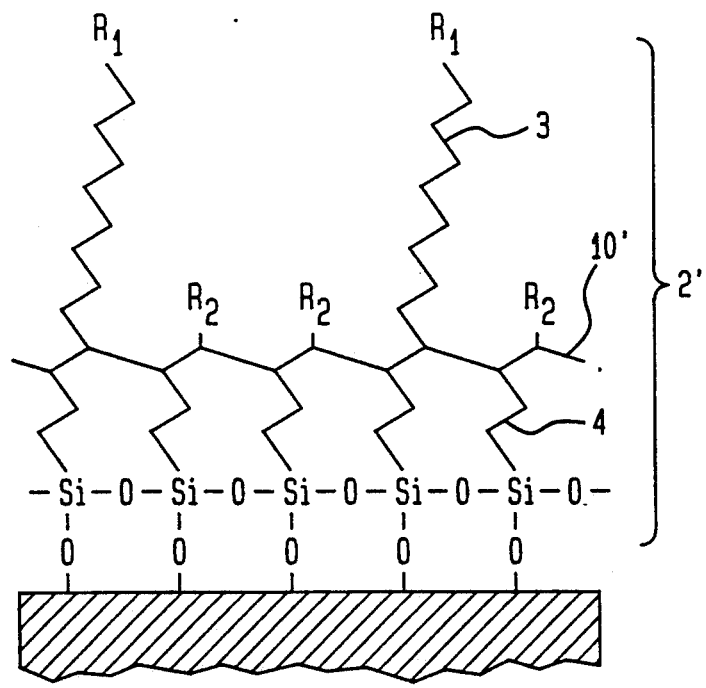
FIGS. 1(b) is a greatly enlarged cross sectional view of a crosslinked monomolecular layer according to the present invention.
Figure 2:
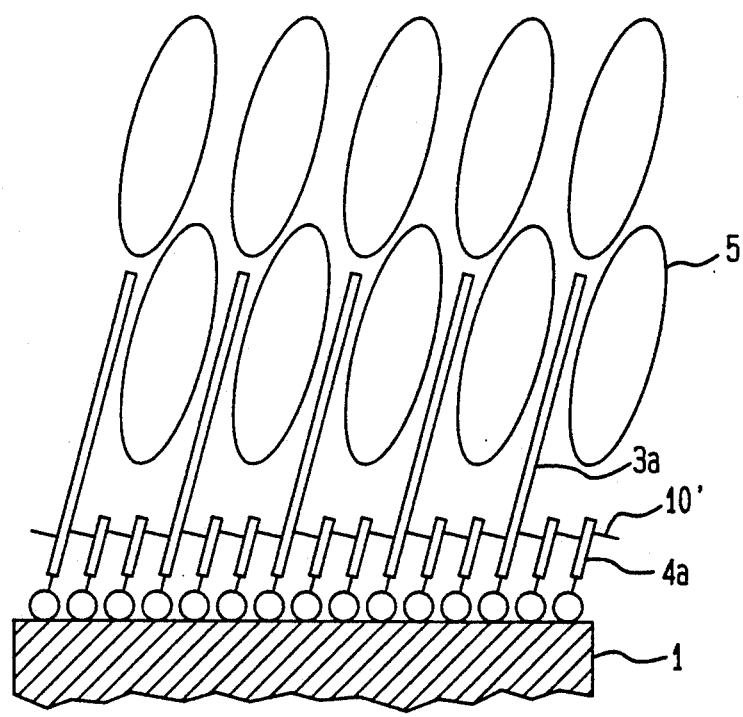
FIGS. 2 is a greatly enlarged schematic cross sectional view of a crosslinked monomolecular layer according to the present invention.

FIGS. 1 to 7 show an embodiment of the invention. As shown in FIG. 1, a hydrophilic substrate 1 (for instance glass, ITO (Indium Tin Oxide), or quartz having —OH groups at the surface) is dried well, and the surface of the substrate is coated with a silane surface active agent containing polymerizable groups and having intramolecular dipoles by a chemical adsorption method. The polymerizable groups are then polymerized by irradiating with an energy beam (for instance, electron beam, alpha ($\alpha$) rays, gamma ($\gamma$) rays or ultraviolet (UV) rays) while the molecules of the surface active agent are held aligned (for instance tilted by an angle of 0.5 degree) in an electric field (of about $1 \times 10^7$ V/cm) or a magnetic field (of about 1 Tesla), thus forming an adsorbed monomolecular polymerized film 2' comprising the silane surface active agent aligned in a fixed direction. In FIG. 1, $R_1$ and $R_2$ may be alkyl groups, alkenyl groups, any substitute group or H.

An example of the silane surface active agent is

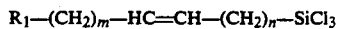

(with m, n being integers, m prefer carbon chains in a range of 1 to 3, n prefer carbon chains in a range of 1 to 22, and m+n most suitably of long straight carbon chains in a range of 10 to 25, being an integer most suitably of short straight carbon chains in a range of 1 to 5, and $R_1$ being a substitute group, such as H, alkyl group, fluoro alkyl group, alkenyl group, aryl group, cycloalkyl group, vinyl group, acyl group, trimethylsilyl group, and/or those derivative group) containing polymerizable groups and having long straight hydrocarbon chains 3 or short straight hydrocarbon chains 4.

Represented as —HC=CH— is a vinyl group 10 as typical polymerizable group. Other polymerizable groups which can be utilized are acetylide (—C≡C—) group, buthadiene (—HC=CH—HC=CH—) group and diacetylene (—C≡C—C≡C—) group.

Particularly, diacetylene (—C≡C—C≡C—) groups are capable of undergoing a topochemical polymerizing reaction (polymerization on a surface) when irradiated with ultraviolet rays and are thus more convenient for the present invention.

The composition ratio of the silane-based surface active agent between the long straight carbon chains and short carbon chains is suitably anywhere from 1:0 to 1:10. For example, short carbon chain compound 4 is;

and long carbon chains compound 3 is;

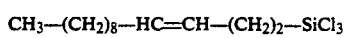

used in combination with the mole ratio of the long carbon chain compound to the short carbon chain compound set to about 1:2. This composition is dissolved in a mixtured solvent at a concentration of $2 \times 10^{-3}$ to $5 \times 10^{-2}$ Mol/l. The mixtured solvent are containing 80 wt % n-hexane, 12 wt % carbon tetrachloride and 8 wt % chloroform. And the substate 1 is dipped in the solution. At this time, the surface of substrate 1 has a hydrophilic surface containing —OH groups.

That is, —SiCl$_3$ group and —OH group undergo a dehydrochlorination reaction given as formula;

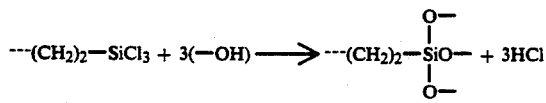

As shown above, the adsorbed monomolecular film 2 comprising the silane surface active agent is formed as a single layer (with a thickness of 1 to 3 nm) on the substrate surface. To this end, a molecule design is provided such that the vinyl groups 10 in the two different surface active molecules noted above have the same height level in the monomolecular film. By so doing, it is possible to form a monomolecular film 2 on the substrate surface such that hydrophobic straight hydrocarbon chains having different lengths are aligned with a particular ratio (FIG. 1(a)).

Then, by setting the system at a predetermined angle in a magnetic field of about one tesla, all the adsorbed molecules are aligned in the magnetic direction. In this state, the system is irradiated with an energy beam in a nitrozen atmosphere, for instance about 5 M(mega)rads of X-rays. As a result, the vinyl groups are polymerized, and the individual adsorbed molecules are frozen in a particular alignment direction via crosslinking bonds 10' (FIG. 1(b)). When a liquid crystal is brought into contact with the substrate with such alignment film formed thereon, the molecules of the liquid crystal 5 enters the interstices among the long carbon chains 3a of the adsorbed monomolecular film to control the alignment of the liquid crystal as a whole. Schematically shown by 3a and 4e are long and short carbon chains 3 and 4 shown in FIG. 1.

Although a particular silane based surface active agent has been illustrated, any suitable chemical adsorption material may be used provided it includes group capable of bonding with an —OH group (for instance an —SiCl group).

For example, the adsorbed monomolecular film may be manufactured by using, a silane-based surface active agent containing F (fluorine) for a portion of straight hydrocarbon chains, e.g.,

(n: an integer most suitably in a range of 10 to 25) or

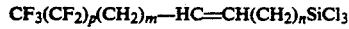

(p, m and n being integers, m prefer carbon chains in a range of 1 to 3, n prefer carbon chains in a range of 1 to 22, p prefer carbon chains in a range of 3 to 10, and p+m+n most suitably in a range of 5 to 25).

Further, it is possible to change the alignment characteristics by mixing with in predetermined composition ratio; (1) a silane-based surface active agent, which contains long straight carbon chains with a portion thereof replaced with substitute groups (R$_1$) and the other end constituted by trichlorosilane groups; and (2) a silane-based surface active agent, which contains short carbon chains with a portion thereof replaced with substitute groups and the other end constituted by trichlorosilane groups; and adsorbing the mixture.

Figure 3A:
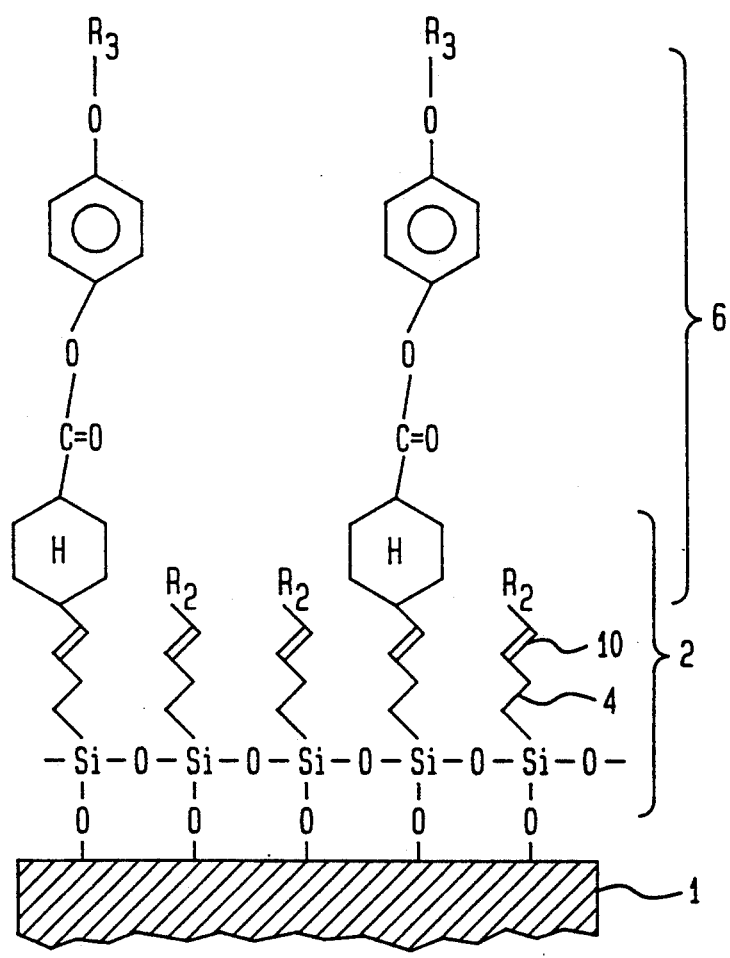
FIG. 3(a) is a greatly enlarged cross sectional view of an uncrosslinked monomolecular layer according to the present invention.
Figure 3B:
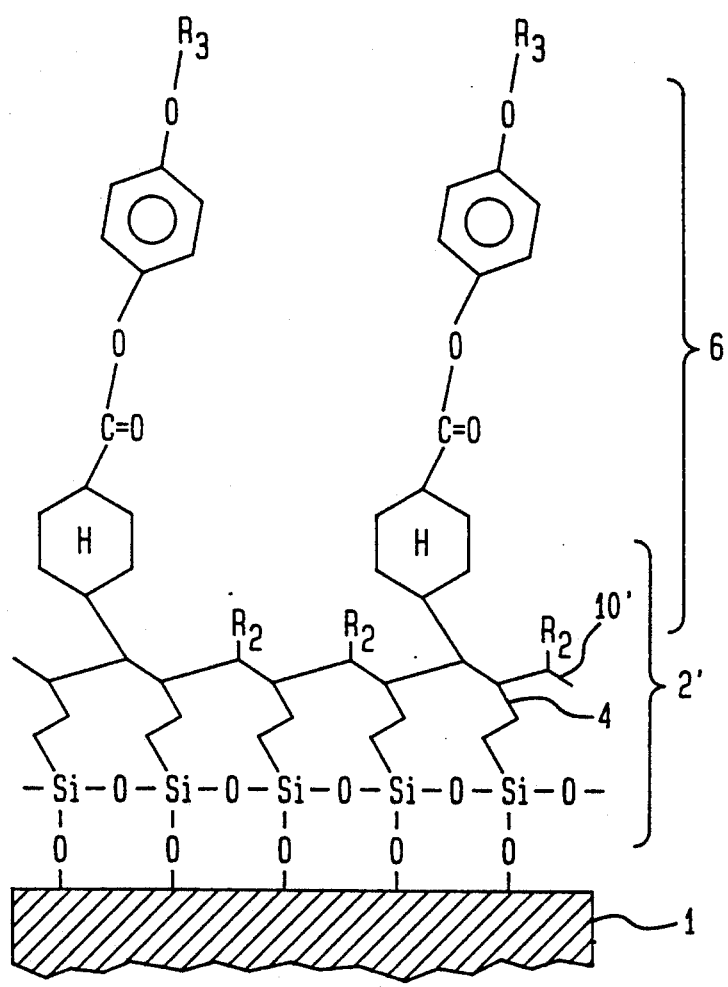
FIG. 3(b) is a greatly enlarged cross sectional view of a crosslinked monomolecular layer according to the present invention.

Further, by mixing in a predetermined composition ratio; (1) a silane-based surface active agent, which contains polymerizable groups and to which are coupled liquid crystal molecules (for instance a nematic liquid crystal portion 6 shown in FIG. 3) similar to the sealed liquid crystal as a portion of substute groups; and (2) a silane-based surface active agent having short carbon chains and polymerizable groups; followed by adsorption and polymerization in the manner described above, an alignment film can be obtained, which has excellent alignment characteristics particularly with respect to a specific sealed liquid crystal. In FIGS. 3(a) and (b), R$_3$ represents a usual hydrocarbon chain substitute group or H.

Figure 4:
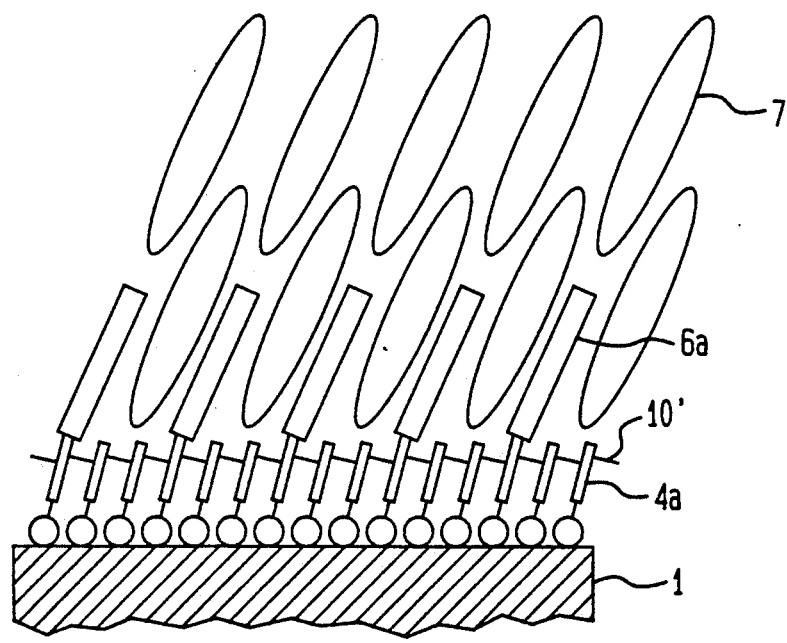
FIG. 4 is a greatly enlarged schematic cross sectional view of a crosslinked monomolecular layer according to the present invention.
Figure 5A:
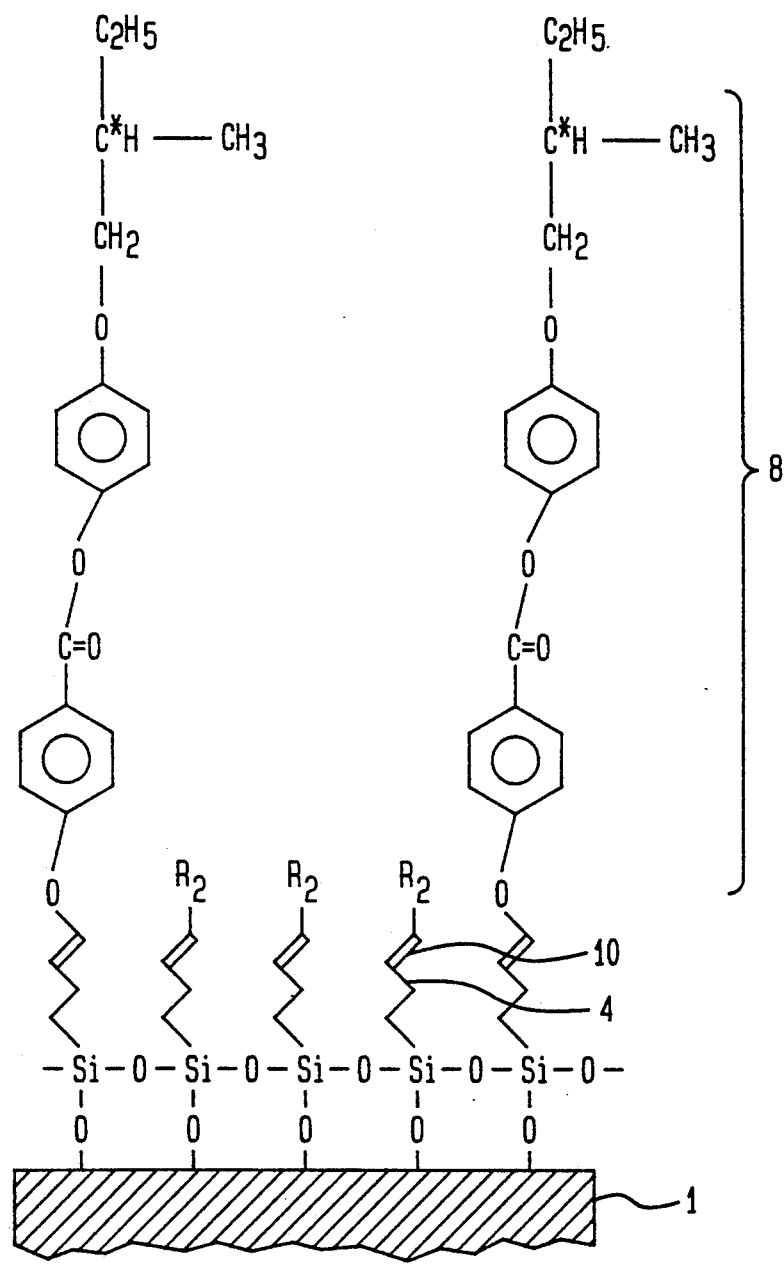
FIG. 5(a) is a greatly enlarged cross sectional view of an uncrosslinked monomolecular layer according to the present invention.
Figure 5B:
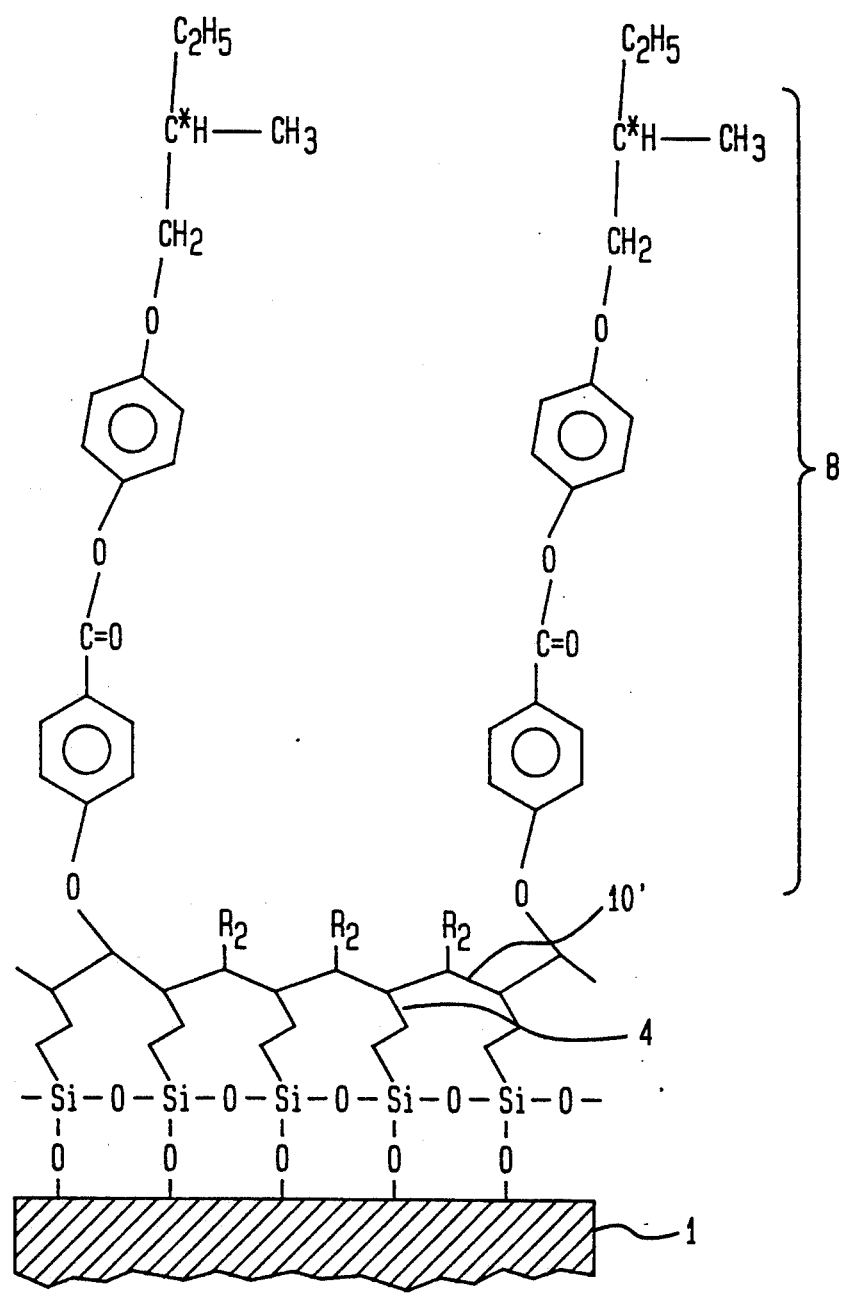
FIG. 5(b) is a greatly enlarged cross sectional view of a crosslinked monomolecular layer according to the present invention.

When the nematic liquid crystal 7 is brought into contact with the substrate provided with the crosslinked and fixed alignment film having such a nematic liquid crystal portion 6, the molecules of the nematic liquid crystal 7 enters the interstices among the nematic liquid crystal sections 6a of the adsorbed monomolecular film, as shown in FIG. 4, thus permitting excellent control of the alignment property of the liquid crystal as a whole. Schematically shown at 4a and 6a are short carbon chains 4 and nematic liquid crystal portion 6 respectfully, as shown in FIGS. 3(a) and (b).

Where sealed compounds of the liquid crystal molecules contain a ferroelectric liquid crystal, a surface-based surface active agent with ferroelectric liquid crystal portion 8 coupled thereto and a silane-based surface active agent having short carbon chains are adsorbed in a predetermined composition ratio. By so doing, a monomolecular adsorbed alignment film as shown in FIGS. 5(a) and (b) can be obtained.

Figure 6:
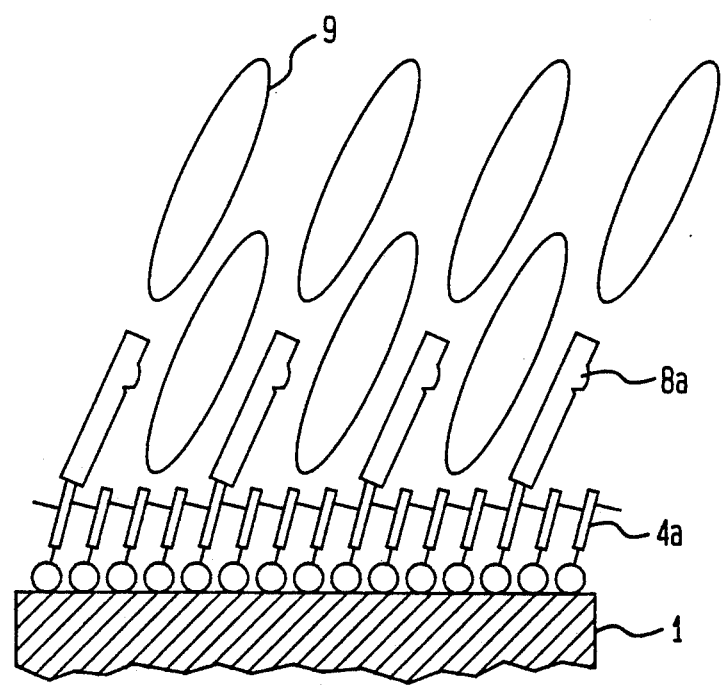
FIG. 6 is a greatly enlarged schematic cross sectional view of a crosslinked monomolecular layer according to the present invention.

As the ferroelectric liquid crystal liquid crystals based on azomethine, azoxys or ester. Again in this case, as the ferroelectric liquid crystal is brought into contact with the substrate provided with an alignment film having the ferroelectric liquid crystal 8, the molecules of the ferroelectric liquid crystal 9, as shown in FIG. 6, enter the interstices among the ferroelectric liquid crystal portion 8a of the adsorbed monomolecular film. This permits excellent control of the alignment properties of the liquid crystal as a whole. Schematically shown at 4a and 8a are short carbon chains 4 and ferroelectric liquid crystal portion 8 shown in FIGS. 5(a) and 5(b).

In the foregoing, typical examples of the liquid crystal alignment film were shown, i.e., (1) one which is obtained by simultaneously chemically adsorbing a plurality of different silane-based surface active agents mixed in predetermined proportions and having polymerizable groups; and (2) one which is produced by a monomolecular film obtained by causing adsorption in a predetermined composition ratio of a silane-based surface active agent with liquid crystal molecules coupled thereto and a silane-based surface active agents having short carbon chains, and causing polymerization of the polymerizable groups in a state of alignment in an electric or magnetic field, thereby effecting the crosslinking and fixing of the adsorbed molecules. Where a liquid crystal alignment film is produced by adsorption from a single silane-based surface active agent containing straight carbon chains and polymerizable groups, followed by polymerization and fixing in a vertically aligned state, it is possible to obtain a liquid crystal alignment film, which permits substantially vertical alignment of the liquid crystal.

Figure 7:
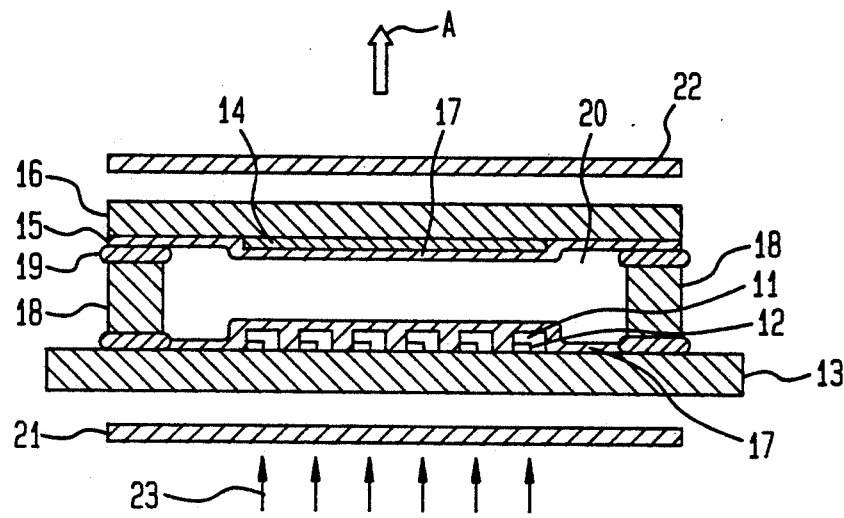
FIG. 7 is a schematic cross sectional view of a liquid crystal display device having alignment films according to the present invention.
Figure 8:
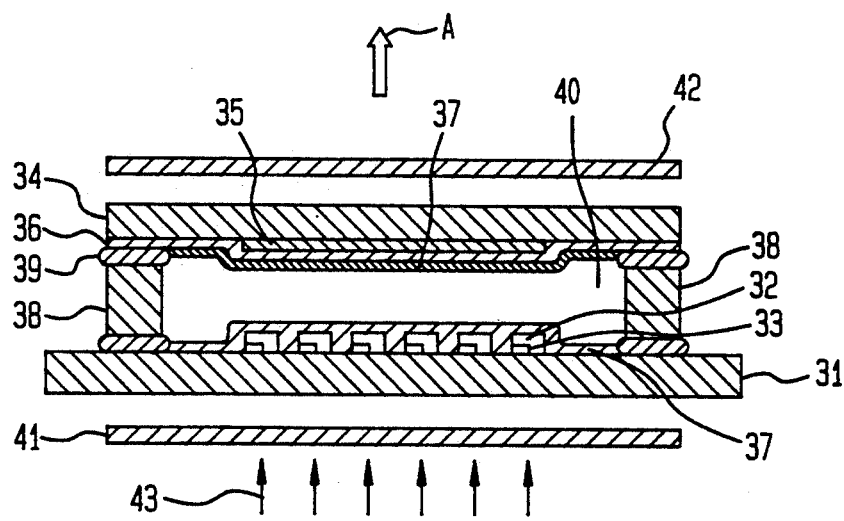
FIG. 8 is a schematic cross sectional view of a liquid crystal display device using prior art alignment

Using such alignment film as above, a liquid crystal display device can be manufactured as follows. As shown in FIG. 7, a first substrate 13 is provided with a first electrode group 11 in a matrix array and also with a transistor group 12 for driving the electrode group. A second substrate 16 is provided with a color filter group 14 opposing the first electrode group and a second electrode 15. Thereafter, a silane-based surface-active agent is chemically adsorbed on one or both electrodes either directly or indirectly via an insulating film in a nonaqueous organic solvent (e.g., n-cetane as n-paraffin, which permits efficient control of long molecular alignment). Silicon in the active agent and a natural oxide film on the substrate surface are thus chemically bonded to form a monomolecular film which will become a liquid crystal alignment film. Then, polymerization is effected with the film in a state of alignment. Afterwards, the first and second substrates 13 and 16 are positioned such that they oppose each other and are secured together with a spacer 18 interposed between then using adhesive 19. Then a predetermined liquid crystal 20 is injected into the space between the substrates. The system thus obtained is then combined with polarizer plates 21 and 22 to complete the device. With this device, a video image can be displayed in the direction of arrow A by driving the individual transistors using a video signal while illuminating the entire surface with backlight 23.

Experiments were conducted in connection with FIGS. 1(a), 1(b), 3(a), 3(b), 5(a), and 5(b) using a compound in which $R_1$ and $R_2$ are H and $R_3$ is $CH_3$. The chemical deposition was carried out by using the method described before in connection with FIG. 1. In the case where vinyl groups or acetylenic groups were involved, the irradiation was performed with 5 M(mega)rads of X rays. Where diacetylene groups were involved, irradiation with 50 mJ/cm$^2$ of ultraviolet rays could be utilized. In these ways, liquid crystal alignment films as shown in FIGS. 1, 3 and 5 could be obtained.

As has been described in the foregoing, according to the invention a liquid crystal alignment film is manufactured by causing chemical adsorption as a monomolecular layer of a silane-based surface active agent directly or indirectly on electrode surface and then causing polymerization in a state of alignment. Thus, unlike the prior art, polishing (or rubbing) is unnecessary, and the alignment film can be obtained highly efficiently, thinly and uniformly.

In addition, the adsorbed alignment film may be coupled a specific liquid crystal, e.g., nematic liquid crystal or ferromagnetic liquid crystal. Thus, excellent alignment control can be obtained. Moreover, the insulating film intervening between the liquid crystal and electrode is very thin, and thus it is possible to reduce the energy for driving the liquid crystal display device.

Further, the liquid crystal alignment film according to the invention comprises a monomolecular film including straight carbon chains, which are directly or indirectly chemically adsorbed at one end to an electrode via —Si—O— bonds and cross linked while aligned in a particular direction. Thus, a high quality alignment film used for a liquid crystal display panel can be obtained without the polishing (or rubbing).

Yet further, with the method of manufacturing a liquid crystal alignment film according to the invention, the polymerization can be carried out with the chemically adsorbed monomolecular film aligned under an electric or magnetic field, thus permitting formation of the liquid crystal alignment film highly efficiently, thinly and uniformly.

Furthermore, with the liquid crystal display apparatus according to the invention, a high performance display panel using the liquid crystal can be manufactured at a low cost.

Moreover, with the method of manufacturing a liquid crystal display apparatus according to the invention the high performance display panel can be manufactured logically and efficiently.

What is claimed:

1. A liquid crystal display apparatus, which comprises a pair of opposed electrodes, a liquid crystal alignment film formed on at least one of the electrodes and a liquid crystal provided between the opposed electrodes, said liquid crystal alignment film comprising a monomolecular film having straight carbon chains, said straight carbon chains having one end directly or indirectly chemically absorbed to an electrode through a —Si—O— covalent bond and being crosslinked in a state of alignment in a particular direction.

2. The liquid crystal display apparatus according to claim 1, wherein said monomolecular film is covalently bonded directly or indirectly to an electrode.

3. The liquid crystal display apparatus according to claim 1, wherein liquid crystal molecules are coupled to portions of said straight carbon chains.

4. The liquid crystal display apparatus according to claim 1, wherein said straight carbon chains include long straight carbon chains having 10 to 25 carbon atoms, and short straight carbon chains having 1 to 5 carbon atoms.

5. The liquid crystal display apparatus according to claim 4, wherein at least one end of either of said long straight carbon chains or said short carbon chains comprises a residue of a trichlorosilane group.

6. The liquid crystal display apparatus according to claim 4, wherein at least one end of both of said long straight carbon chains and said short carbon chains comprises a residue of a trichlorosilane group.

7. The liquid crystal display apparatus according to claim 4, wherein a liquid crystal compound or psuedo liquid crystal molecules are coupled to a portion of said long straight carbon chains.

8. The liquid crystal display apparatus according to one of claims 3 or 7, wherein said liquid crystal molecules or psuedo liquid crystal molecules comprise nematic liquid crystal, or pseudo liquid crystal molecules used in combination with nematic crystal.

9. The liquid crystal display apparatus according to one of claims 3 or 7, wherein said crystal molecules or pseudo liquid crystal molecules comprise a ferroelectric crystal, or pseudo liquid crystal molecules used in combination with a ferroelectric crystal.

10. The liquid crystal display apparatus according to claim 9, wherein said ferroelectric crystal is selected from the group consisting of azomethine, azoxy, ester ferroelectric crystals.

11. A method of manufacturing a liquid crystal display apparatus, which comprises the steps of:

a) causing chemical adsorption of a silane-based surface active agent having straight carbon chains and polymerizable groups in a non-aqueous organic solvent either directly or indirectly as a thin film on an electrode of a first substrate provided in advance with a first electrode group in a matrix array;

b) irradiating the adsorbed silane-based surface active agent with an energy beam, while the agents are maintained in an aligned state by application of a magnetic or electric field, to cause reaction of the polymerizable groups and thus effect crosslinking thereof, thereby effecting alignment and fixing of the adsorbed silane-based surface active agent or agents;

c) positioning a second substrate with a second electrode group opposing the first electrode group and bondingly securing the first and second substrates to each other; and d) injecting a predetermined liquid crystal portion into the space defined between the first and the second substrates.

12. The method of manufacturing a liquid crystal display apparatus according to claim 11, wherein said plurality of different silane-based surface active agents are a silane-based surface active agent containing polymerizable groups and having long straight carbon chains and a silane-based surface active agent containing polymerizable groups and having short carbon chains.

13. The method of manufacturing a liquid crystal display apparatus according to claim 12, wherein the composition ratio of said silane-based surface active agent with long straight carbon chains and that having short carbon chains is 1:0 to 1:10.

14. The method of manufacturing a liquid crystal display apparatus according to claim 12, wherein one end of said long straight carbon chains includes a silane-based surface active agent having trichlorosilane groups, and one end of said short carbon chains comprises a silane-based surface active agent having trichlorosilane groups.

15. The method of manufacturing a liquid crystal display apparatus according to claim 12, wherein said silane-based surface active agent containing a polymerizable group and having long straight carbon chains is represented by a formula $$R_1-(CH_2)_m-X-(CH_2)_n-SiCl_3 \qquad (A)$$

where m, n and m+n represents integers of 10 to 25, X represents a polymerizable group which may be a double bond group or a triple bond group, and $R_1$ represents a substitution group.

16. The method of manufacturing a liquid crystal display apparatus according to claim 15, wherein X in said silane-based surface active agent shown in formula (A) is $-C\equiv C-C\equiv C-$.

17. The method of manufacturing a liquid crystal display apparatus according to claim 11, wherein said energy beam is selected from the group consisting of an electron beam, gamma rays, alpha rays and ultraviolet rays.

18. The method of manufacturing a liquid crystal display apparatus according to claim 11, wherein said non-aqueous solvent contains n-paraffin.

19. The method of manufacturing a liquid crystal display apparatus according to claim 18, wherein said n-paraffin is n-cetane.

* * * * *